United States Patent [19]

Schneider

[11] 4,221,329
[45] Sep. 9, 1980

[54] SELF-CLEANING PERFORATION DETECTOR AND METHOD

[75] Inventor: Herbert R. Schneider, Pinellas Park, Fla.

[73] Assignee: Eastman Kodak Company, Rochester, N.Y.

[21] Appl. No.: 965,639

[22] Filed: Dec. 1, 1978

[51] Int. Cl.² ............................................. G06K 7/10
[52] U.S. Cl. .................................... 235/458; 235/452
[58] Field of Search ............... 235/452, 454, 458, 459, 235/460, 461

[56] References Cited

U.S. PATENT DOCUMENTS

| 2,510,552 | 6/1950 | Carroll et al. | 235/452 |
| 3,019,970 | 2/1962 | MacNeill | 235/452 |

Primary Examiner—Daryl W. Cook
Attorney, Agent, or Firm—Lawrence P. Kessler

[57] ABSTRACT

A perforation detector including a housing having a first portion and an oppositely disposed second portion for receiving the perforated area of a traveling web therebetween. One portion supports an optical signal emitter and the other portion supports a receiver for detecting the optical signal. The first portion is connected to a source of pressurized fluid such as filtered air. Such portion has a passage for directing the fluid flow, in the form of a fluid curtain, about the optical element in that portion and toward the optical element in the second portion. The fluid flow thus prevents accumulation of signal interferring particulate matter on and between the optical elements.

8 Claims, 4 Drawing Figures

U.S. Patent  Sep. 9, 1980  4,221,329
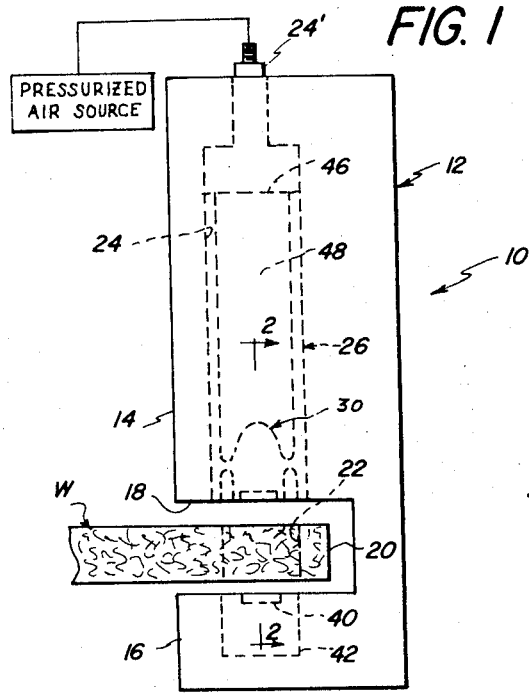
FIG. 1
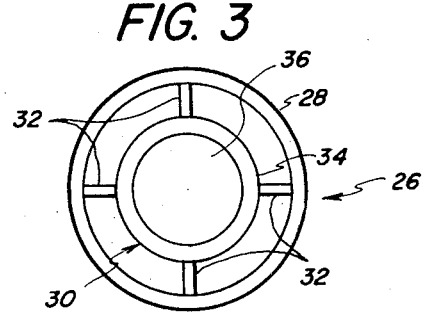
FIG. 3
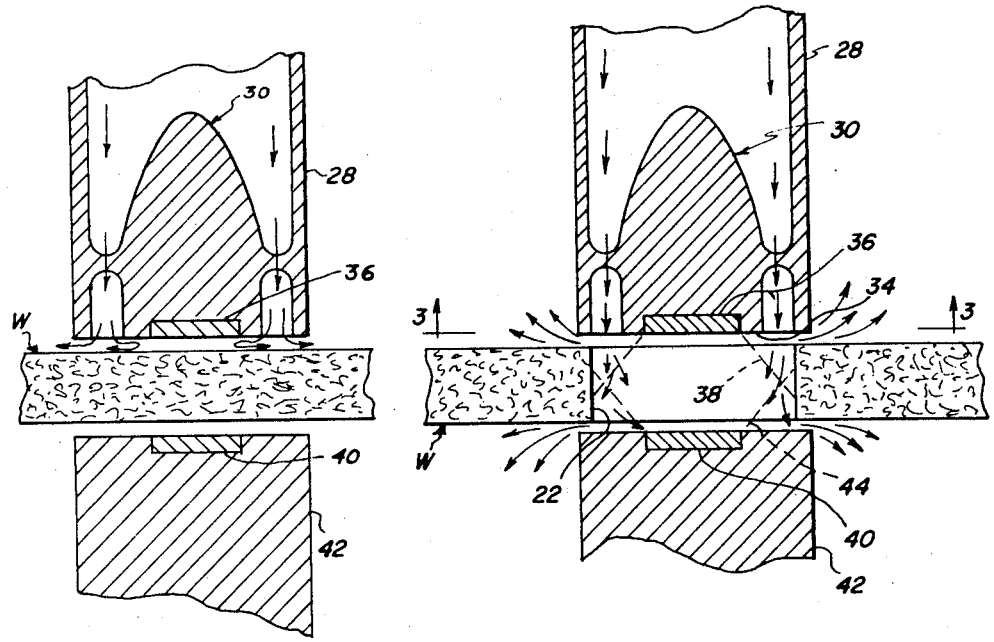
FIG. 2a
FIG. 2

SELF-CLEANING PERFORATION DETECTOR AND METHOD

BACKGROUND OF THE INVENTION

1. Field of the Invention

This invention relates generally to apparatus for detecting perforations in a traveling web and more particularly to a self-cleaning perforation detector and method.

2. Detection of the Prior Art

It is a well known practice to detect perforations in a traveling web. The perforations may be used to control web movement. Additionally the perforations may be used to control the operation of remote work stations or may be employed in retrieval of information from the web or controlling processing steps on the web as it travels about its course. Detection may be accomplished by directly sensing the perforations by mechanical means, or by indirectly sensing the perforations by electrical means such as optical or ultrasonic scanning mechanisms.

Typically, the perforation detector has a signal emitter on one side of the traveling web and a signal receiver for detecting the signal passing through the perforations or reflected from the web. When the web functions in an atmosphere laden with particulate matter (dust), or generates such particulate matter during web movement, the matter tends to accumulate on the signal emitter and/or the receiver. Such accumulation adversely affects the ability of the detector to accurately detect the perforations. Apparatus for cleaning the web may alleviate the problems associated with particulate matter generated by or adhering to the web surface, but does not prevent matter in the atmosphere from depositing on the signal emitter or receiver.

SUMMARY OF THE INVENTION

In the improved perforation detector of this invention, a flow of fluid is utilized to clean and to prevent particulate matter from accumulating on elements which detect the perforations in a traveling web. The fluid flow, of pressurized filtered air for example, is directed across one of the elements and toward the other element to prevent the particulate matter from accumulating on and between the elements. More particularly, a housing supporting at least one of the elements has a passage for directing the fluid flow in the form of a fluid curtain about such element and toward the other element.

BRIEF DESCRIPTION OF THE DRAWINGS

In the description of the preferred embodiment of the invention, reference is made to the accompanying drawings, in which:

FIG. 1 is a side elevational view of the self-cleaning perforation detector of this invention;

FIG. 2 is a front elevational view on an enlarged scale of a portion of the detector, in cross-section taken along lines 2—2 of FIG. 1, showing a perforation in a traveling web located between the detector elements;

FIG. 2a is a view similar to FIG. 2, but with an unperforated portion of the web located between the detector elements; and FIG. 3 is a bottom elevational view of the detector emitter element and support structure taken along lines 3—3 of FIG. 2.

DESCRIPTION OF THE PREFERRED EMBODIMENT

The self-cleaning perforation detector of this invention, designated generally by the numeral 10 in FIG. 1, includes a housing 12. The housing 12 has a first portion 14 and an oppositely disposed second portion 16 defining an opening 18 therebetween. The housing of course could be formed of spaced separate members. The housing 12 is located so that a marginal edge 20 of the traveling web W passes through the opening 18. The traveling web W is typically a strip of material (such as, for example, plastic, metal, or paper) bearing encoded information in the form of a series of perforations or punched holes. The series of perforations 22 (one shown) are located adjacent to the marginal edge 20 of the web so that as the marginal edge passes through opening 18 the perforations may be detected by the detector 10.

The first portion 14 of the housing 12 has a cylindrical chamber 24 communicating at one end with the opening 18. The opposite end of the chamber 24 is connected by a coupling 24' to a pressurized fluid source, such as filtered (i.e., dust free) air. A mount 26 is supported within the chamber 24. The mount 26 has a cylindrical wall 28 of an external diameter substantially equal to the internal diameter of the chamber 24. The mount is open at both ends to permit the flow of pressurized air therethrough. A streamlined receptacle 30 is connected to the wall 28 of the mount 26, for example, by structural webs 32 so that the base 34 of the receptacle is positioned adjacent to opening 18. The base 34 carries an emitter 36 such as, for example, a light emitting diode (LED) having suitable activating leads (not shown). The emitter 36 of the preferred embodiment is selected to produce an optical signal having an envelope designated by the numeral 38 in FIG. 2, sufficient to illuminate any perforation 22 passing through the opening 18.

A receiver 40 such as, for example, a photodetector having suitable leads (not shown) is supported in the second portion 16 of the housing 12. Support for the receiver 40 is provided by a mount designated by the numeral 42, or alternatively by a mount of similar construction to mount 26. The receiver 40 is located adjacent to the opening 18 and is selected to have a viewing angle, designated by the numeral 44, of sufficient size for receiving the optical signal from the emitter 36. The optical signal from the emitter passes through the perforations 22 and, if the web W is substantially transparent to the optical signal, through the web at a reduced level. The receiver 40 produces an output signal in response to detection of the optical signal. The output signal is fed through the leads from the receiver 40 to a signal processor (not shown). The signal processor interprets the level of the output signal to determine the presence or absence of a perforation. In response to such determination the processor produces a signal which can be used for example to control the course of travel of the web, retrieve information from the web, or control processing steps associated with or independent of the web. A typical optical signal emitter and receiver useful for detecting perforations in a moving web is, for example, the Photon Coupled Interrupter H13B1-H13B2 available from the General Electric Company, Syracuse, N.Y.

While perforation detection has been described as being carried out by an optical signal emitter and receiver, such detection could be accomplished by any other type detector emitting a signal (transmitted through or reflected by the web) which would be interferred with by particulate matter, without departing from the scope of the invention. The orientation of the housing supporting such other types of detector elements relative to the traveling web would be dependent upon the particular detector employed.

The self-cleaning function of the detector 10 is accomplished by the fluid admitted to the chamber 24. An opening 46 in the top of the mount 26 allows the fluid under pressure (filtered air in the preferred embodiment) to enter the interior 48 of the mount. The air flows past the streamlined receptacle 30, through the open area between the webs 32, out of the mount past the receptacle base 34 and toward the receiver 40. By forming the receptacle 30 with a streamlined dome in the direction opposite to the air flow, resistance to the flow is minimized. This, in turn minimizes the pressure drop in the air flow through the mount 26. Thus the air exiting from the mount forms a curtain which prevents particulate matter in the atmosphere surrounding the detector 10 (including that generated by the web) from depositing on the surface of the emitter 36 and carries such matter away from the emitter.

When an unperforated area of the web W passes between the emitter 36 and the receiver 40 (FIG. 2a), the air flow impinges on the web and a portion of the flow is deflected across the face of the emitter, as well as out of the sides of the mount 26. The deflected air additionally serves to effectively wash the surface of the emitter carrying away the particulate matter to keep the emitter clean. When an area of the web having a perforation (FIG. 2) passes between the emitter 36 and receiver 40, a portion of the air flow curtain passes through such perforation. Such portion of the curtain prevents particulate matter from depositing on the surface of the receiver and washes the surface of the receiver carrying away the matter to keep the receiver clean. Additionally, it may clean away any particulate matter which has accumulated in the perforations. In this manner the emitter and receiver of the detector 10, and the area therebetween are kept free of signal interferring matter, thus maintaining the reliability of perforation detection by the detector.

The invention has been described in detail with particular reference to a preferred embodiment thereof, but it will be understood that variations and modifications can be effected within the spirit and scope of the invention.

I claim:

1. In apparatus having a detector for detecting perforations in a web generating particulate matter or traveling in an atmosphere which may contain such matter, said detector including a signal emitter element and signal receiver element, the improvement comprising:
    means for establishing a flow of fluid and for directing such fluid flow across said detector to prevent accumulation of particulate matter on said detector, said flow directing means including a housing for supporting at least one of said elements, and a passage defined by said housing for the flow to form a fluid curtain about said one element and extending toward said other element.

2. The invention of claim 1 wherein said housing includes a receptical for one of said elements, said receptical having a streamlined dome shape directed toward the flow of fluid, and means for locating said receptical within said passage to facilitate fluid flow about said one element.

3. The invention of claim 1 wherein said emitter element is a light emitting diode and said signal receiver element is a photodetector.

4. The invention of claim 1 wherein said fluid is filtered air.

5. In apparatus having optical signal emitting means and optical signal receiving means for detecting perforations in a traveling web generating particulate matter or traveling in an atmosphere which may contain such particulate matter, the improvement comprising means for establishing a flow of fluid about one signal means and toward the other signal means to prevent accumulation of particulate matter on and between said signal means, said flow establishing means including:
    a housing having a first portion and a second portion spaced therefrom for receiving the traveling web therebetween; one of said portions of said housing supporting said signal emitting means so that the envelope of the optical signal emitted thereby includes the web perforations, and the other of said portions supporting said signal receiving means so that the viewing angle thereof includes the optical signal emitted by said signal emitting means; said first portion of said housing defining a passage for the fluid to form a fluid curtain about the signal means supported therein and extending toward the signal means supported in said second portion.

6. The invention of claim 5 wherein said housing further includes a receptacle streamlined in the direction opposite to fluid flow, said receptacle containing one of said signal means, and means for locating said receptacle within said passage to facilitate fluid flow about said one signal means.

7. Method of preventing accumulation of particulate matter on and between optical signal emitting means and signal receiving means disposed for detecting perforations in a web generating particulate matter or traveling in an atmosphere which may contain such particulate matter, said method comprising the step of:
    directing a flow of fluid about one of the signal means toward the other signal means to form a fluid curtain for removing particulate matter from both signal means and for transporting such removed particulate matter away from both signal means.

8. The method of claim 7 wherein said flow of fluid is filtered air under pressure.

* * * * *